United States Patent
Kühl et al.

(10) Patent No.: US 9,528,219 B2
(45) Date of Patent: Dec. 27, 2016

(54) DOMESTIC APPLIANCE FOR DRYING A HUMID PRODUCT, COMPRISING A COOLING ASSEMBLY AND A HEATING ASSEMBLY

(75) Inventors: Hans-Detlev Kühl, Dortmund (DE); Andreas Stolze, Falkensee (DE)

(73) Assignee: BSH Hausgeräte GmbH, Munich (DE)

(*) Notice: Subject to any disclaimer, the term of this patent is extended or adjusted under 35 U.S.C. 154(b) by 1425 days.

(21) Appl. No.: 12/918,082

(22) PCT Filed: Feb. 11, 2009

(86) PCT No.: PCT/EP2009/051579
§ 371 (c)(1),
(2), (4) Date: Nov. 3, 2010

(87) PCT Pub. No.: WO2009/103643
PCT Pub. Date: Aug. 27, 2009

(65) Prior Publication Data
US 2011/0047813 A1    Mar. 3, 2011

(30) Foreign Application Priority Data
Feb. 19, 2008    (DE) .................. 10 2008 009 784

(51) Int. Cl.
F26B 3/00    (2006.01)
D06F 58/20    (2006.01)

(52) U.S. Cl.
CPC .............. *D06F 58/206* (2013.01); *Y02B 30/52* (2013.01)

(58) Field of Classification Search
CPC ..... F02G 2250/18; F02G 1/043; F02G 1/0435
(Continued)

(56) References Cited

U.S. PATENT DOCUMENTS 1,275,507 A    8/1918   Vuilleumier
3,698,182 A *  10/1972  Knoos ............................ 60/522
(Continued)

FOREIGN PATENT DOCUMENTS

DE    1410206 A1    10/1968
DE    4023000 C2    2/2003
(Continued)

OTHER PUBLICATIONS

Kuhl, Dr.-Ing. Hans-Detlev, "Thermodynamische Konzeption, Auslegung und Optimierung an Beispielen aus der Warmepumpen- und Kaltetechnik", Habilitationsschrift, Fachbereich Chemietechnik der University of Dortmund, Apr. 30, 2003.

*Primary Examiner* — Jason Lau
(74) *Attorney, Agent, or Firm* — Nixon & Vanderhye P.C.

(57) ABSTRACT

A domestic appliance for drying a damp product by means of a process air stream that is conducted in a process air channel. The appliance has a treatment chamber that includes the damp product. A cooling assembly cools and condenses the process air stream after it flows through the treatment chamber. A first heat exchanger supplies heat from the process air stream to a working fluid. A heating assembly heats the process air stream before it flows through the treatment chamber and a second heat exchanger supplies heat from the working fluid to the process air stream. The working fluid is conducted in a heat pump that has at least two mechanically coupled displacement pistons. The heat pump operates according to a regenerative gas cycle process that includes a Vuilleumier gas cycle process.

24 Claims, 5 Drawing Sheets

(58) Field of Classification Search
USPC .................................... 34/73, 76, 78; 62/6
See application file for complete search history.

(56) References Cited

U.S. PATENT DOCUMENTS

| | | | | |
|---|---|---|---|---|
| 4,416,114 | A * | 11/1983 | Martini | 60/526 |
| 4,683,723 | A * | 8/1987 | Doi et al. | 62/6 |
| 5,400,599 | A * | 3/1995 | Sekiya et al. | 62/6 |
| 5,615,556 | A * | 4/1997 | Honda et al. | 62/6 |
| 6,470,679 | B1 * | 10/2002 | Ertle | 60/512 |
| 2005/0183208 | A1* | 8/2005 | Scheper et al. | 8/142 |
| 2006/0021744 | A1* | 2/2006 | Vogel | 165/170 |
| 2006/0053651 | A1* | 3/2006 | Tadano et al. | 34/74 |
| 2008/0308264 | A1* | 12/2008 | Antonijevic | 165/165 |

FOREIGN PATENT DOCUMENTS

| | | |
|---|---|---|
| DE | 19738735 C2 | 2/2003 |
| JP | 08057194 A | 3/1996 |
| JP | 2008018384 A1 | 2/2008 |
| WO | 2006029953 A1 | 3/2006 |

* cited by examiner

DOMESTIC APPLIANCE FOR DRYING A HUMID PRODUCT, COMPRISING A COOLING ASSEMBLY AND A HEATING ASSEMBLY

BACKGROUND OF THE INVENTION

The invention relates to a domestic appliance for drying a damp product by means of a process air stream that can be conducted in a process air channel, said stream flowing through a treatment chamber comprising the product, a cooling assembly for cooling and condensing the process air stream once the latter has passed through the treatment chamber, the cooling assembly having a first heat exchanger, by means of which heat from the process air stream can be supplied to a working fluid, and a heating assembly for heating the process air stream before the latter flows through the treatment chamber, said heating assembly having a second heat exchanger by means of which heat from the working fluid can be supplied to the process air stream.

The invention also relates to a method for drying a damp product by means of a process air stream conducted in a process air channel, said process air stream flowing though a treatment chamber comprising the product, a cooling assembly for cooling the process air stream and condensing moisture from the process air stream once the latter has passed through the treatment chamber, and a heating assembly for heating the process air stream before the latter flows through the treatment chamber, heat from the air stream being supplied to a working fluid in the cooling assembly and heat from the working fluid being supplied to the process air stream in the heating assembly.

DE 40 23 000 C2, DE 197 38 735 C2 and WO 2006/029953 A1 each describe a domestic appliance in which the cooling assembly and the heating assembly form part of a heat pump in which some of the heat that is removed from the air stream in the cooling assembly is in any case supplied to the air stream again in the heating assembly.

According to DE 40 23 000 C2 a compressor heat pump is used in which a working medium (carbon dioxide or chlorinated and/or fluorinated hydrocarbon) is compressed into the gaseous state by a compressor, then liquefied in a first heat exchanger while emitting heat, then relieved of pressure as it passes through a throttle and is evaporated in a second heat exchanger by absorbing heat. Finally it returns to the compressor. According to DE 197 38 735 C2 a heat pump is used in which a first working medium (ammonia) is periodically absorbed and desorbed by a second working medium (water). According to document WO 2006/029953 A1 a heat pump is used in which thermoelectric elements, also called Peltier elements and constructed with special semi-conductor materials, act to conduct the heat.

A washing machine is known from DE 1 410 206 A in which laundry can be dried in addition to being washed. The document discloses several alternatives for the additional mechanisms that are required for this purpose. An electrical heating device for heating an air stream used for drying laundry can be provided along with a single heat exchanger for cooling the heated air stream following loading of the laundry, it being possible for the heater and the cooler to also form part of a heat pump device, however. The heat pump device can also be configured in such a way that it works with Peltier elements in order to utilize the thermoelectric effect.

A device, which emerges from an English excerpt belonging to the collection of data "Patent Abstracts of Japan" relating to JP 08 057 194 A, for drying laundry contains in its first channel system, in addition to a heater and a cooler which both form part of a thermoelectrically operated heat pump device, a further heat exchanger connected upstream of the cooler for cooling the air stream removed from the laundry, and an additional heating device connected downstream of the heater for additional heating of the air stream prior to loading of the laundry.

A Stirling process and a Vuilleumier process as examples of a regenerative gas cycle process are known from the document "Wärmetransformationsprozesse ohne Phasenumwandlung" [Heat transformation processes without phase conversion] by Dr Hans-Detlev Kühl, available on the internet since Nov. 26, 2006 under the address http://hdl.handle.net/2003/2798, see in particular pages 1 to 29. Each of these processes is suitable for use in a heat pump or a cooling device, applications in power engineering (for example in the heating of buildings) or for substance separation (in particular liquefaction and separation of air) being considered.

Reference is also made to U.S. Pat. No. 1,275,507 belonging to the inventor Rudolph Vuilleumier with regard to the Vuilleumier process.

In all generic domestic appliances with heat pumps which do not use the thermoelectric effect heat is absorbed and released in the working medium in phase transitions. Specific conditions relating to pressure and temperature must be adhered to for it to be possible to attain and effectively use the required phase transitions. This sometimes makes adjustment of the heat pumps to the temperature levels that are required in a domestic appliance difficult. The thermoelectric heat pump requires the use of special, expensive semi-conductor components and presents specific problems with regard to heat insulation and dry air conduction as heat can only be pumped over relatively short physical distances therein. This makes construction of a corresponding domestic appliance difficult. Furthermore, every known heat pump in a domestic appliance reaches the optimal operating conditions only relatively slowly on start-up. This results in an extended time requirement for a drying process, something which a user must regard as being very disadvantageous and not least of all because domestic appliances comprising heat pumps are conventionally sold at very high prices and are bought with high expectations accordingly.

BRIEF SUMMARY OF THE INVENTION

The object of the present invention is to provide a possibility for drying a damp product in the home, which operates with an environmentally friendly, in particular natural coolant, while taking account of a compact construction and sufficient dehumidification output.

The domestic appliance is constructed for drying a damp product and is in particular a tumble dryer, for example a stand-alone dryer or integrated in a washer-dryer. For this purpose the domestic appliance has a process air channel in which a process air stream can be conducted, in particular by means of a process air fan. The process air stream can flow through a treatment chamber, for example a washer drum, comprising the product, for example batches of laundry. The domestic appliance also has a cooling assembly through which the process air can flow, for cooling and condensing the process air stream once the latter has passed through the treatment chamber, the cooling assembly having at least a first heat exchanger, for example a condenser, by means of which heat from the process air stream can be supplied to a working fluid, for example a gas or a liquid. The domestic appliance also has a heating assembly for heating the process air stream before the latter flows through the treatment chamber, said heating assembly having at least one second heat exchanger, by means of which heat from the working fluid can be supplied to the process air stream.

According to the invention the working fluid is conveyed in a heat pump which works according to a basically regenerative gas cycle process and has at least two displacement pistons. Furthermore, at least two of the displacement pistons are mechanically coupled. According to the invention the regenerative gas cycle process also comprises a Vuilleumier gas cycle process.

The mechanical coupling means that a certain, for example fixed or substantially fixed, phase relation may be achieved between the displacement pistons at low constructional cost and so as to be compact. It is also particularly easy to influence the piston movement in this way.

According to the invention the regenerative gas cycle process comprises a Vuilleumier gas cycle process. The working fluid is then a gas, preferably helium. The Vuilleumier gas cycle process can be configured as a pure Vuilleumier gas cycle process or as a combined Vuilleumier gas cycle process, for example a Vuilleumier gas cycle process which is combined with a Stirling gas cycle process.

A domestic appliance can be preferred in which two of the displacement pistons are constructed as part of a free-piston vibrating system. This provides the possibility of creating a particularly compact arrangement that can be adjusted to different working points particularly easily.

The, in particular two, displacement pistons are preferably coupled via at least one spring element.

It is then preferred if the spring element has a spring constant between 3 N/mm and 15 N/mm, in particular between 6 N/mm and 7 N/mm.

It is also preferred if the spring element is received in a first, cold displacement piston as power losses can then be independently equalized, i.e. without external exciters.

For effective operation it is advantageous if a first, cold displacement piston has a weight between 3 kg and 6 kg, in particular between 4 kg and 5 kg, if a second, hot displacement piston has a weight between 1 kg and 2 kg, if a piston diameter of the displacement pistons is between 75 mm and 200 mm, in particular between 100 mm and 150 mm, if a piston stroke of the displacement pistons is between 25 mm and 75 mm, in particular between 30 mm and 50 mm, and/or if a middle pressure on the displacement pistons is between 20 bar and 75 bar, in particular between 30 bar and 50 bar.

To equalize power losses without using an external exciter a domestic appliance is particularly preferred in which a first, cold displacement piston has a recess for at least partially receiving a body that is fixedly arranged in a working volume, the body immersing into the recess as a function of a stroke of the cold displacement piston.

It is particularly preferred if the body has a cylindrical basic shape, in particular with a diameter between 25 mm and 75 mm, specifically between 40 mm and 50 mm. Other basic shapes are also possible, however, for example parallelepiped.

Alternatively a plurality, in particular two, displacement pistons can be coupled to each other by means of a coupler mechanism. These have the advantage of simulating vibrations better than the free-piston vibrating system which often requires an exciter for this purpose.

To equalize power losses is it then preferred if the coupler mechanism can be externally driven, for example by means of an exciter unit, for example a speed-controlled motor for drying the shaft of the coupling wheel.

To adjust a working point of the heat pump, for example to adapt to a degree of dryness and/or loading, it is preferred if the coupler mechanism can be driven so as to be frequency- or speed-controlled, for example by a frequency-controlled exciter, for example a speed-controlled motor.

To achieve a compact construction it is preferred if the displacement pistons run in a common cylinder.

A domestic appliance can also be preferred in which the displacement pistons run collinearly. Alternatively the displacement pistons can run at an angle to each other, for example at an angle of 90°.

For space-optimized arrangement it is preferred if the pistons are arranged in a bottom group structure.

The method for drying a damp product by means of a process air stream conducted in a process air channel, said process air stream flowing though a treatment chamber comprising the product, a cooling assembly for cooling the process air stream and condensing moisture from the process air stream once the latter has passed through the treatment chamber, and a heating assembly for heating the process air stream before the latter flows through the treatment chamber, heat from the air stream being supplied to a working fluid in the cooling assembly and heat from the working fluid being supplied to the process air stream in the heating assembly, comprises the working fluid being conveyed in a regenerative gas cycle process which drives at least two displacement pistons, and the working fluid driving at least two displacement pistons that are mechanically coupled to each other. The regenerative gas cycle process also comprises a Vuilleumier gas cycle process.

The preferred embodiments cited for the domestic appliance are analogously also preferred for the method.

A dryer as a domestic appliance has for example a process air circuit which is formed by the drum with laundry, the heat pump and a process air fan. The Vuilleumier heat pump works according to the principle of a thermally driven regenerative gas cycle process that is similar to the Stirling process. In its pure form it has a constant gas volume which is divided by at least two mechanically coupled, linearly driven or freely vibrating displacement pistons into three periodically changeable partial volumes having different temperature levels. The volumes are connected to each other by two regenerators. Two additional temperature levels are produced by heating the hot working volume (for example electrically or using gas) and these can be used to remove the condensation heat from the drying process and for restoring the higher temperature level. For this purpose these two working volumes are in contact with the process air by way of heat exchangers.

BRIEF DESCRIPTION OF THE DRAWINGS

The invention will be schematically described in more detail in the following figures. Identical or equivalent elements have been provided with the same reference characters in the figures, in which.

DETAILED DESCRIPTION OF EXEMPLARY EMBODIMENTS OF THE PRESENT INVENTION

Figure 1:
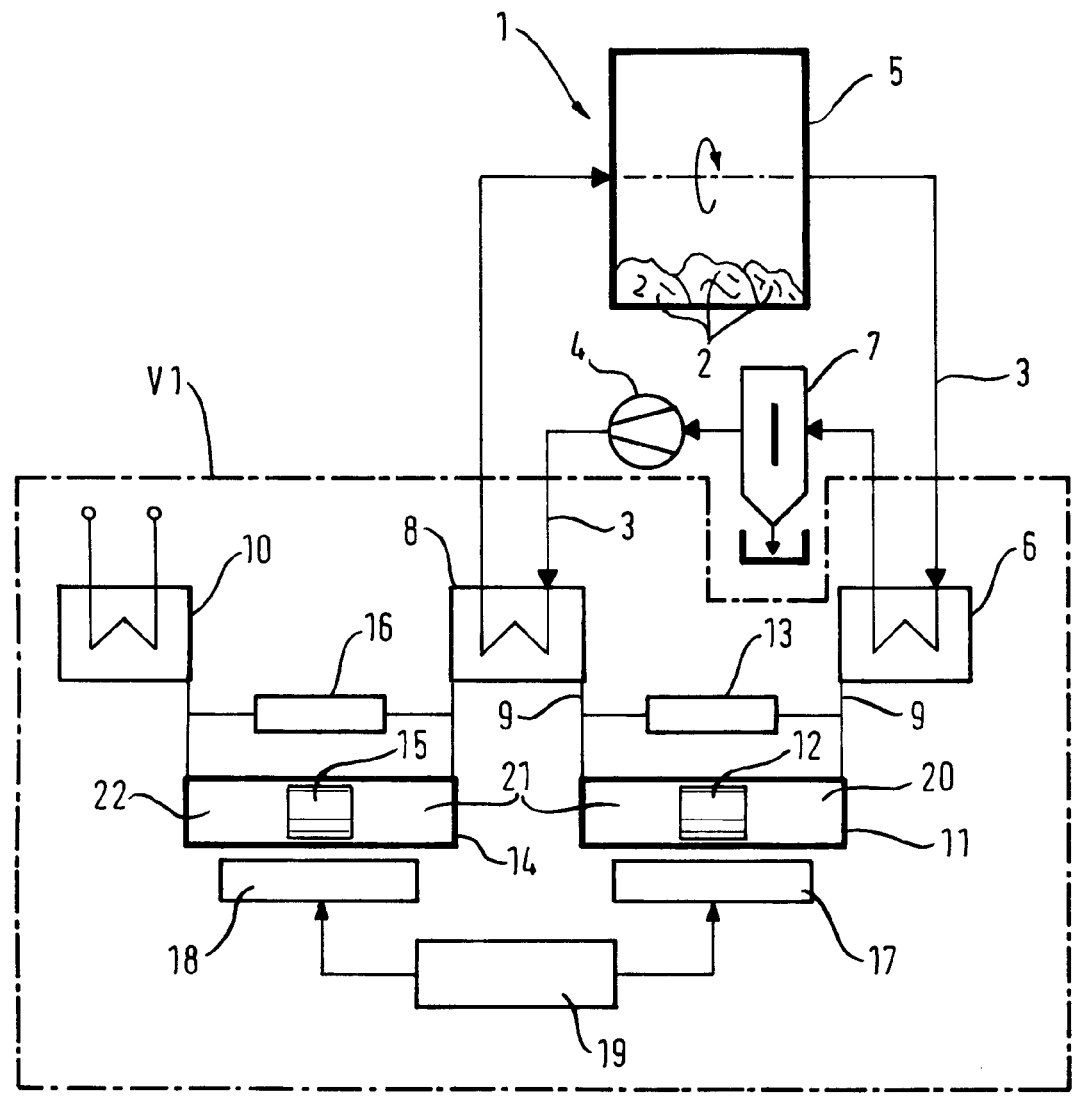
FIG. 1 shows a drawing of a domestic appliance with a Vuilleumier heat pump according to a first embodiment.

FIG. 1 shows a domestic appliance in the form of a tumble dryer 1 for drying a damp batch of laundry 2. The tumble dryer 1 has a substantially closed process air channel 3 in which a process air stream is conducted. The process air stream is driven by a fan 4 for this purpose. The batch of laundry 2 is arranged in a treatment chamber in the form of a rotatable washer drum 5. After the process air stream has passed through the drum 5 it arrives in the process air channel 3 at a first heat exchanger 6 which is used as a condenser 6. The process air stream is cooled therein to the extent that the moisture, which the process air has absorbed from the batch of laundry 2 in the drum 5, condenses. A moisture separator 7 arranged downstream of the condenser 6 is used to separate the condensed moisture. Separated moisture is collected and dispensed with. It is conventional practice to combine the condenser 6 and moisture separator 7 into one component. In the present figures these components are shown separately, primarily for the sake of clarity. The fan 4, which is followed by a second heat exchanger 8, which is constructed as a heater 8 for the process air stream, in the process air channel 3, is located downstream of the condenser 6 and the moisture separator 7. After the process air stream has passed through the second heat exchanger 8, and been heated in the process, it returns to the drum 5 where it can absorb moisture again from the damp laundry 2.

The first heat exchanger 6 and the second heat exchanger 8 are components of a Vuilleumier heat pump V1 and 6, 8 to 19 here. The principles and exemplary embodiments of such Vuilleumier heat pumps (like other heat pumps with regenerative gas cycle processes) can be found in particular in the document by H.-D Kuhl to which reference will again be made below.

The Vuilleumier heat pump V1 and 6, 8 to 19 will be described in detail hereinafter. It has a working gas channel 9 in which a suitable working gas, in this case helium, corresponding as far as possible, at the given temperatures, to an ideal gas is enclosed as a coolant. The working gas channel 9 flows through the first ('cold') heat exchanger or condenser 6 which at a low temperature level acts as a heat sink, wherein it absorbs heat, as described, from the process air stream in the process air channel 3. Inside the working gas channel 9 there is located the second ('warm') heat exchanger 8 which at a medium temperature level acts as a heat source, wherein it supplies heat, in the described manner, to the air stream in the process air channel 3. A heater 10, which is electrically operated and heats the working gas that has arrived therein to a high temperature level, is located at a second end of the working gas channel 9. The heat that passes into the working gas in this way is the energy that drives the regenerative Vuilleumier working gas cycle process in the working gas channel 9.

Between the first heat exchanger 6 and the second heat exchanger 8 the working gas channel 9 has a first cylinder 11 in which a first piston 12 can move. Connected in parallel with the first cylinder 11 is a first regenerator 13 which is a first heat accumulator 13 through which the working gas can largely freely flow. By moving the first piston 12 the working gas is pushed through the first regenerator 13 and can therefore be conveyed from the first heat exchanger 6 to the second heat exchanger 8 or back. It emits potential excess heat to the first regenerator 13 in the process or absorbs potentially insufficient heat therefrom and, more precisely, depending in which direction it flows through the first regenerator 13. The working volume 20 connected to the first heat exchanger (condenser 6) is also called a 'cold' working volume; the working volume 21 connected to the second heat exchanger 8 (heat source) is accordingly called a 'warm' working volume.

Between the second heat exchanger 8 and the heater 10 the working gas channel 9 has a second cylinder 14 with a second piston 15 that can move therein and, again connected in parallel with the second cylinder 14, a second regenerator 16. By displacing the second piston 15 working gas is transported by the regenerator 16 from the second heat exchanger 8 to the heater 10 or back, wherein it again emits excess heat or absorbs insufficient heat. The working volume 21 connected to the first heat exchanger (condenser 6) is also called a 'warm' working volume 21 here; the working volume 21 connected to the heater 10 is called a 'hot' working volume.

Periodic and mutually coordinated movements of the first piston 12 and second piston 15 that have a well-defined phase relation to each other are used to operate the Vuilleumier process with the working gas. A first linear drive 17 for the first piston 12 and a second linear drive 18 for the second piston 15 are provided for this purpose and are controlled by a controller 19 and move the pistons 12 and 15 contactlessly. This is advantageously possible in particular because the Vuilleumier process is operated solely with the thermal energy supplied by the heater 10 and the introduction of mechanical energy via the pistons 12 and 15 is only required to the extent that the working gas has to be conveyed back and forth between the first heat exchanger 6, the second heat exchanger 8 and the heater 10. To a greater or lesser extent only inertial and frictional forces in the flowing working gas and the moving pistons 12 and 15 have to be overcome in the process. In particular it is not necessary for the linear drives 17 and 18 and pistons 12 and 15 to touch each other. Instead it is actually possible to lead the pistons 12 and 15 contactlessly through the linear drives 17 and 18. Accordingly it is not necessary to lead moved components out of the working gas channel 9 so as to be sealed. Instead the working gas channel 9 forms an intrinsically completely closed, and in this respect rigid, unit which can therefore be easily, reliably and permanently sealed even if the working gas is subject to a pressure of up to several 100 bar. This is very important for operational reliability and the longevity of the domestic appliance 1.

In a typical drying process, for which a period in the order of an hour should be assumed, the heat pump 1 operates by repeated displacement of the working gas within the working gas channel 9, the pistons 12 and 15 being moved cyclically and mutually phase-shifted with a period in the order of a tenth of a second. A preferred ratio between the duration of the drying process and the duration of the period of the regenerative gas process is therefore between 10,000 and 100,000, particularly preferably between 30,000 and 40,000.

Achieving the stationary phase or drying in the case of underloading can be a problem if the dimensioning of the heat pump V1 is configured with its piston frequency only for stationary operation of the dryer with full loading. To avoid this frictional losses are equalized by means of a frequency adjustment of the (frequency-regulated) linear drive in this case, so it is possible to efficiently adjust the working point to the operating status of the dryer 1.

By using a regenerative gas cycle process this domestic appliance 1 offers the possibility of using a working medium that is non-critical in terms of function and safety. Furthermore, high heat pump factors can be reached at low temperature levels in the corresponding heat pump. A high rating number for the heat pump can be attained with the Vuilleumier heat pump with an optimally high temperature difference between the high and low temperature levels and a comparatively low temperature difference between the middle and low temperature levels. It is therefore possible to create a domestic appliance in the form of a tumble dryer to which an energy efficiency rating of A can be allocated.

Corresponding criteria can be taken into account by the choice of working gas and pressure at which the gas must be in the heat pump. The design of the heat accumulator in the heat pump can favorably influence the operating properties thereof.

Figure 2:
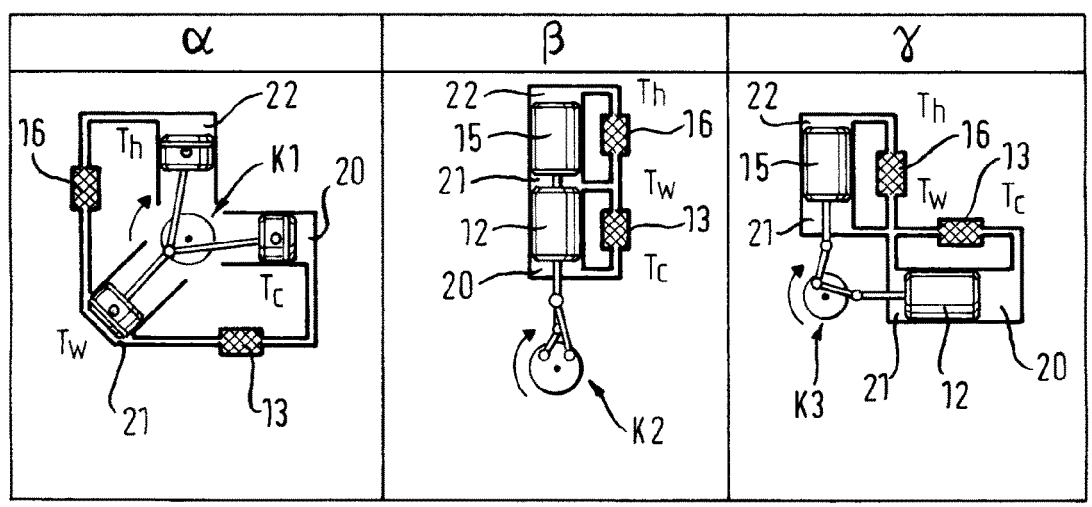
FIG. 2 shows a basic diagram of three designs of a Vuilleumier heat pump with pistons according to H.-D. Kühl that are mechanically coupled by a coupler mechanism.

FIG. 2 shows a basic diagram of three designs of a Vuilleumier heat pump according to H.-D. Kühl, page 23. In this case the pistons are mechanically connected to each other by a common coupler mechanism.

In the case of the α design, which is not prominent in practice, three pistons are mechanically connected to each other in a star shape by a coupler mechanism K1 which combines one coupling rod per piston to a rotatable disk. The coupler mechanism K1 fixes a phase relation of the pistons among each other.

In the case of the β design two pistons 12, 15 are connected in series in a common cylinder and have a fixed phase relation to each other of 90° by way of an external coupler mechanism K2.

In the case of the γ design the two pistons 12, 15 are arranged so as to be at an angle to each other and run in separate cylinders.

Figure 3:
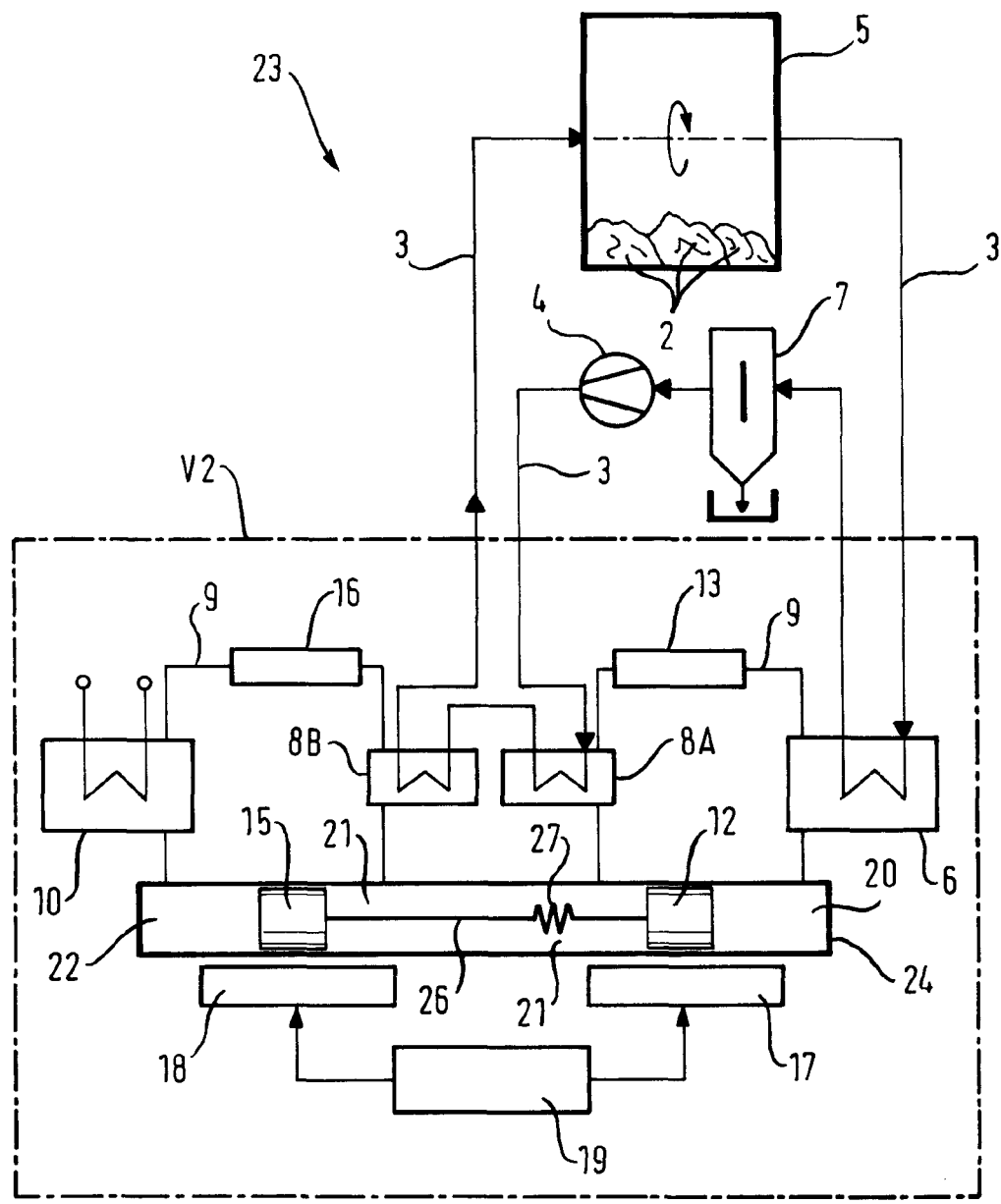
FIG. 3 shows a diagram of a domestic appliance with a Vuilleumier heat pump according to a second embodiment.

FIG. 3 shows a diagram of a further alternative embodiment of a Vuilleumier heat pump V2 for a tumble dryer. The tumble dryer 23 is designed to achieve a dehumidification output of about 40 g water per minute. A process air volume stream of 180-230 m³/h is provided for this purpose and this achieves an entry temperature into the drum 5 of less than 120° C. and an exit temperature from the drum 5 of about 75° C.

Similar to the β design in FIG. 2, the first piston 12 and the second piston 15 are accordingly mechanically coupled to each other therein and run one behind the other in a common cylinder 24. A coupler mechanism is dispensed with, however, in contrast to the β design in FIG. 2. Instead pistons 12, 15 are part of a free-piston vibrating system. This embodiment has proven to be particularly advantageous for a tumble dryer, inter alia as the installation space is thus minimized. The first 'cold' piston 12 is specially designed to have a mass between 4 kg and 5 kg, while the second 'hot' piston 15 has a mass between 1 kg and 1.5 kg. The pistons 12, 15 are connected by means of a piston rod 26. A coupling spring (helical compression spring) 27 is introduced into the load path between the pistons 12, 15 whose spring constant is between 6 N/mm and 7 N/mm in this case. When the Vuilleumier heat pump is dynamically considered, the working gas volumes, for example, together with the piston rods described in more detail below form further dynamic spring elements ('pneumatic springs').

The warm working volumes that are still separate in FIG. 1 are accordingly combined into a single warm working volume 21. Piston frequencies of the pistons 12, 15 of about 10 Hz to 15 Hz result with a piston diameter of pistons 12, 15 between 100 mm and 150 mm, a stroke of the pistons 12, 15 between 30 mm and 50 mm and a medium pressure of about 30 bar to 50 bar. These frequencies are substantially constant for the operating range of the tumble dryer although the piston stroke can change significantly, as is stated in more detail below for FIG. 4.

Furthermore, the second heat exchanger (process air heater) is accordingly in the form of two part-heat exchangers 8A and 8B. The helium-side channels of the aluminum heat exchangers 6, 8A and 8B have a length between 100 mm and 150 mm for an individual channel. Five hundred to 1,000 channels respectively are provided for the cold heat exchanger 6 and the two warm heat exchangers 8A and 8B, depending on the diameter of an individual channel, between 1.5 mm and 2.5 mm here. The air-side lamellae of the heat exchangers 6, 8A and 8B are designed for the required transfer outputs in such a way that the flow losses owing to heat exchangers 6, 8A and 8B are less then 250 Pa.

The regenerators 13, 16 are designed in such a way there that a length of the cold regenerator 13—with a diameter from 80 mm to 150 mm—does not exceed 30 mm to 50 mm (assuming a fiber diameter of 40 μm to 70 μm) and the warm regenerator 16 does not exceed a length of 80 mm to 120 mm (with a fiber diameter of 50 μm to 100 μm).

The hot volume 22 of the heat pump V2 is at a temperature level of more than 500° C. here. During normal operation wall temperatures of an aluminum partition between a process air region and a working gas region lie at 70° C. in the condenser 6 at the process air inlet-side. At the first part-heater or part-heat exchanger 8A corresponding wall temperatures lie at 110° C. to 120° C. and at the second part-heater or part-heat exchanger 8B at 120° C. to 130° C.

The drive 17, 18, 19 is only used to power up the system into its operating state and optionally equalize frictional losses. The drive may also be dispensed with, however, in particular with sufficiently low frictional losses.

Figure 4:
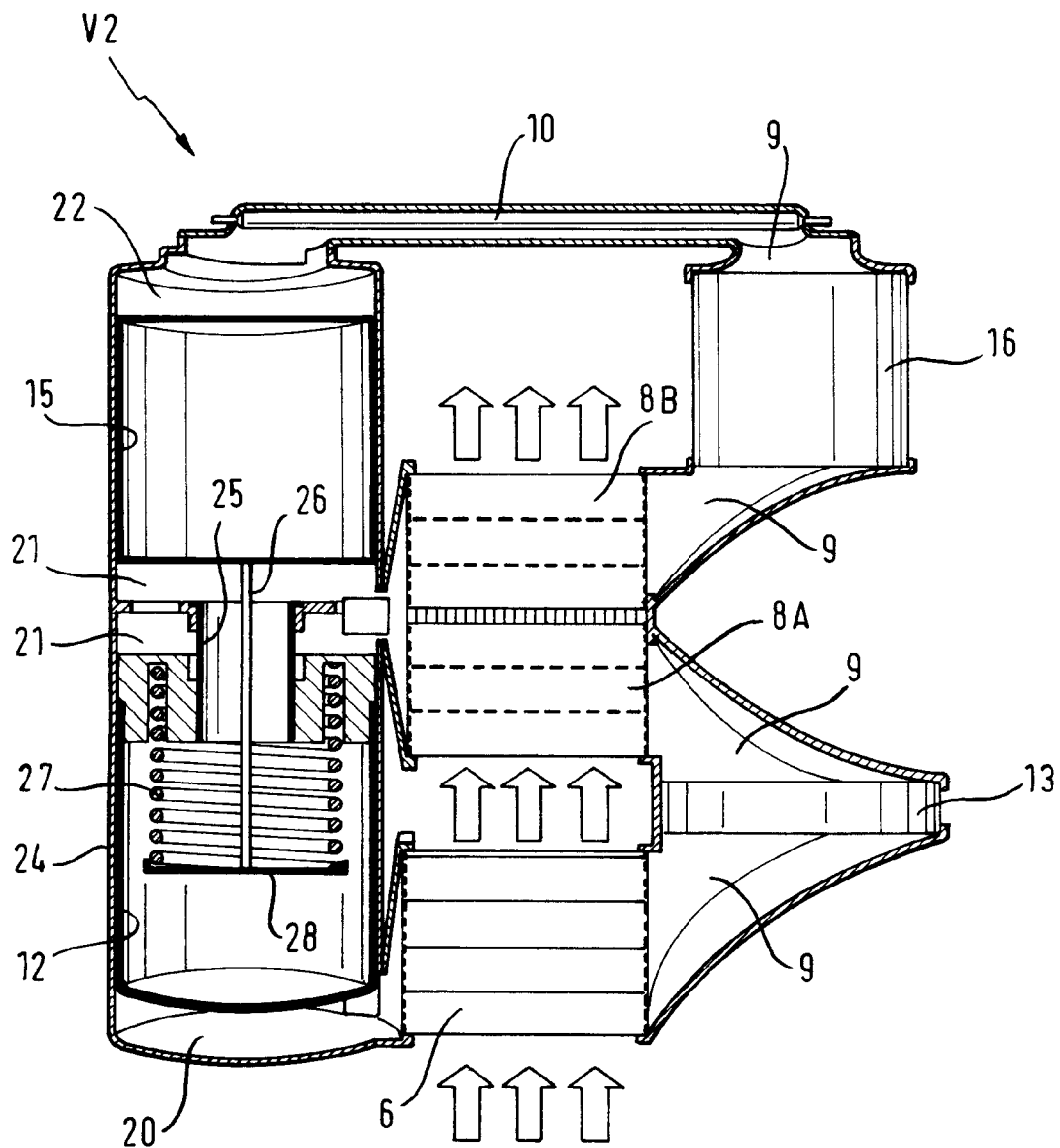
FIG. 4 shows in plan view a Vuilleumier heat pump according to the embodiment for a tumble dryer shown in FIG. 3.

FIG. 4 shows in plan view one possible implementation of the heat pump V2 from FIG. 3. The mechanical connection between the pistons 12, 15 is designed in particular such that the piston rod 26 secured to the 'hot' piston 15 extends into the cold piston 12 and ends therein in a plane seat or cover 28. The coupling spring 27 configured as a helical compression spring sits on the plane seat 28 and at its opposing side rests on the inside on an end face of the cold piston 12.

This design of the free-piston vibrating system, in particular with a high mass of the cold piston 12 (here 4 kg to 5 kg) and lower mass of the hot piston 15 (here 1 kg to 1.5 kg), produces the surprising effect of it being possible to advantageously adapt a drying capacity to a degree of dryness and/or loading particularly effectively because the temperature difference between a cold working volume 20 and a warm working volume 21 increases with lower loading and an increasing degree of dryness. The piston stroke is accordingly reduced, so the drying capacity of the heat pump is also reduced. This is in direct conflict with the desired previous behavior of known Vuilleumier applications, such as in heating installations in which a higher heat pump output is also sought in the case of a higher temperature difference.

A volume element in the form of what is known as a working cylinder 25 is stationarily secured to a wall of the cylinder 24 in the region of the warm working volume 21. The working cylinder 25 immerses to a greater or lesser extent into the cold displacement piston 12 depending on the position of the cold displacement piston 12. For this purpose the cold displacement piston 12 has a corresponding recess (without reference character) in which the working cylinder 25 is conveyed so as to be tight (i.e. without or with only slight or negligible leakage caused by a gap). A stroke movement of the cold displacement piston 12 accordingly leads to a change in the working volume that is available for the Vuilleumier process. Consequently (p, V) work is performed which serves to equalize frictional losses in the Vuilleumier heat pump. To obtain the total energy balance the heater, which in this case is in the form of a heating element 10 arranged in the working gas channel, must be heated more strongly than in the case of a loss-free Vuilleumier process. Owing to the losses from converting current into thermal energy, the use of a heater 10 in the Vuilleumier process initially seems more disadvantageous than a direct electromechanical drive, as is used for example for a Stirling motor. However the use of a heating element 10 is much cheaper and more reliable than a drive motor with the gears that are required for it and does not cause any heat losses either.

The diameter of the working cylinder 25 lies between 40 mm and 50 mm. The piston rod 26 is led through the working cylinder 25. In the volumetric sense the working body 25 can also be taken to mean the piston rod 25 of the cold displacement piston 12.

Laterally offset from the cylinder 24 the heat exchangers 6, 8A, 8B are arranged behind each other in a straight line (linearly) for the process air. The heat exchangers 6, 8A, 8B are therefore asymmetrically arranged (on one side) with respect to the displacement pistons 12, 15. The conduction of the process air is indicated by the arrows, the warm and moist process air issuing from the drum initially being led for condensation through the condenser 6 and then for heating through the two part-heat exchangers 8A and 8B. The regenerators 13, 16 are located collinearly to each other and even more laterally offset. The position of the cylinder 24, the heat exchangers 6, 8A, 8B and the regenerators is therefore substantially coplanar. The process air conduction allows air resistance-reduced and installation space-optimized flow behavior to be attained. A basically coplanar design is also advantageous with non-linear, for example axially parallel or angled, arrangement of the pistons 12, 15, the heat exchangers 6, 8A, 8B and/or the regenerators 13, 16. The illustrated design differs significantly from known designs, for example from heating installations, in which liquid/liquid heat exchangers are conventionally located around the working volumes and therefore surround them.

A phase displacement of the pistons 12, 15 of about 90° can be adjusted by means inter alia of dimensioning of spring constants of the system (mechanical spring 27 or pneumatic spring) and the cross-sections of the piston rods 25, 26. Losses can be taken account of in the process.

Figure 5:
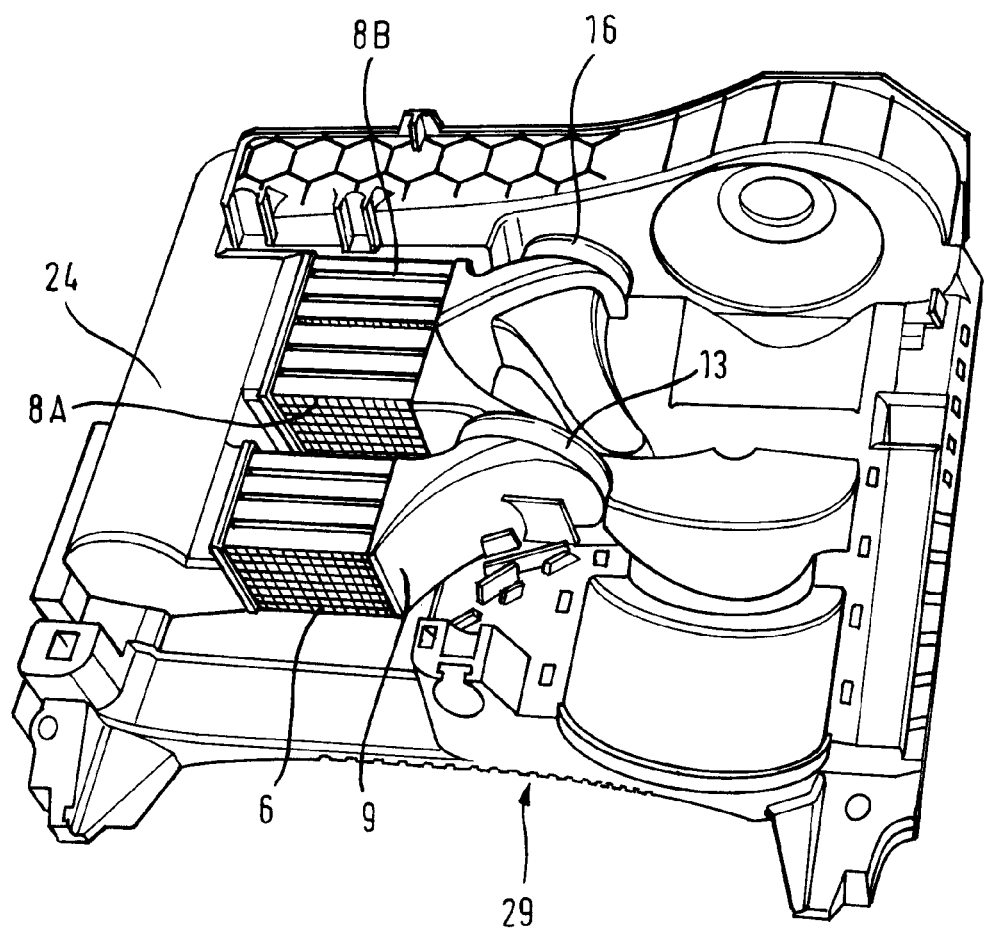
FIG. 5 shows in an oblique view the Vuilleumier heat pump from FIG. 4.

FIG. 5 shows a bottom group structure 29 for a tumble dryer according to the Vuilleumier construction shown in FIG. 3 and FIG. 4. The bottom group structure 29 shows the condenser 6, the two part heat exchangers 8A and 8B, part of the working gas channel 9, the first regenerator 13 and the second regenerator 16 and the cylinder 14. The illustrated heat pump with free-piston vibrating system is minimized in terms of installation space and is not bigger than 450×450 mm.

A heating capacity between about 2,000 W to 2,500 W for the desired dehumidification can be achieved with approx. 800 W to 1,000 W heat recovery with this dimensioning of the heat pump that is compatible with the installation space. A drying process with an energy efficiency rating of A is achieved with this condensation capacity. An additional heat exchanger (not shown) is used to meet the condensation rate, however. As the cooling capacity of the additional heat exchanger is less than 800 W it can be very small and can also be arranged for example in the bottom group structure or in the region of the door. Any known, suitable designs of heat exchanger can be used for the additional heat exchanger. The additional heat exchanger can, for example, be arranged between the cold heat exchanger and the warm heat exchanger. It can, however, also be arranged in the process air channel downstream of the drum and upstream of the heat pump and then also act as a fluff filter, for example.

Helium, for example, can be used in the described heat pump dryer as a natural, environmentally neutral, non-combustible and non-toxic working gas. It achieves the same dehumidification output as a known condensation dryer while maintaining the A energy efficiency rating.

Obviously the present invention is not limited to the illustrated embodiments.

Therefore, instead of a free-piston vibrating system it is possible to use a coupler mechanism, for example according to the α, β or γ basic forms shown in FIG. 2 with a common coupler mechanism K1, K2 and K3. The coupler mechanisms can be arranged externally to the piston cylinders or in the working gas volume. An angled arrangement of the pistons, in particular a 90° arrangement, can therefore be presented, for example with central coupler mechanism.

On the one hand an angled arrangement of the pistons makes air conduction more complicated with the positioning of the heat exchangers and regenerators, but allows the additional heat exchanger to be more easily accommodated in the bottom group structure.

If the dimensioning of the heat pump is designed with its piston frequency for stationary operation of the dryer with a full load, reaching the stationary phase or drying in the case of underloading can be a problem. To avoid this, frictional losses are equalized by means of a speed-regulated drive of the coupler mechanism and the piston frequency is adjusted to unsteady operation and operation with a partial load. The heat pump therefore operates at an optimal working point in different operating states.

An additional spring (for example a mechanical or pneumatic spring) for fixing the position of the pistons in the piston housing may, by way of example, also be used.

The process air fan may also be arranged at a different location in the process air channel, for example directly before the process air enters the drum or upstream of a process air heater.

Hydrogen for example may also be used as an environmentally friendly working gas instead of helium.

The domestic appliance can, for example, be designed as a stand-alone dryer or washer dryer or be in the form of a dishwasher, for example.

LIST OF REFERENCE CHARACTERS 1 domestic appliance
2 batch of laundry
3 process air channel
4 fan
5 washer drum
6 first heat exchanger, condenser
7 moisture separator
8 second heat exchanger, heater
8A first part-heater
8B second part-heater
9 working gas channel
10 heater for working gas
11 first cylinder
12 first piston
13 first heat accumulator, first regenerator
14 second cylinder 15 second piston
16 second heat accumulator or second regenerator
17 first linear drive
18 second linear drive
19 controller
20 cold working volume
21 warm working volume
22 hot working volume
23 tumble dryer
24 cylinder
25 working cylinder
26 connecting rod
27 spring element
28 plane seat
29 bottom group structure
V1 Vuilleumier heat pump
V2 Vuilleumier heat pump

The invention claimed is:

1. A domestic appliance for drying a damp product by means of a process air stream conducted in a process air channel, the domestic appliance comprising:
   a treatment chamber that is configured to receive the damp product, wherein the process air channel is configured so that the process air stream flows through the treatment chamber;
   a cooling assembly configured to cool and condense the process air stream after the process air stream flows through the treatment chamber, the cooling assembly having a first heat exchanger to supply heat from the process air stream to a working fluid, wherein the process air stream is configured to flow through the cooling assembly;
   a heating assembly downstream of the cooling assembly configured to heat the process air stream before the process air stream flows through the treatment chamber, the heating assembly having a second heat exchanger configured to supply heat from the working fluid to the process air stream, wherein the process air stream is configured to flow through the heating assembly; and
   a heat pump configured to operate according to a Vuilleumier gas cycle process and in which the working fluid is conducted, the heat pump having a cold displacement piston and a hot displacement piston that are mechanically coupled as part of a free-piston vibrating system and at least in part define a cold working volume and hot working volume, respectively, wherein the cold displacement piston has a higher mass than the hot displacement piston and the heat pump is configured to reduce piston stroke so that drying capacity of the process air stream is reduced as temperature difference between the cold working volume and the hot working volume increases.

2. The domestic appliance of claim 1, further comprising a spring element that couples the cold displacement piston and the hot displacement piston.

3. The domestic appliance of claim 2, wherein the spring element has a spring constant between 3 N/mm and 15 N/mm.

4. The domestic appliance of claim 3, wherein the spring constant is between 6 N/mm and 7 N/mm.

5. The domestic appliance of claim 2, wherein the spring element is received in the cold displacement piston.

6. The domestic appliance of claim 5, wherein the cold displacement piston has a weight between 3 kg and 6 kg.

7. The domestic appliance of claim 6, wherein the weight is between 4 kg and 5 kg.

8. The domestic appliance of claim 1, wherein the hot displacement piston has a weight between 1 kg and 2 kg.

9. The domestic appliance of claim 1, wherein the cold displacement piston and the hot displacement piston have a respective piston diameter between 75 mm and 200 mm.

10. The domestic appliance of claim 9, wherein the respective piston diameter is between 100 mm and 150 mm.

11. The domestic appliance of claim 1, wherein the cold displacement piston and the hot displacement piston have a respective piston stroke between 25 mm and 75 mm.

12. The domestic appliance of claim 11, wherein the respective piston stroke is between 30 mm and 50 mm.

13. The domestic appliance of claim 1, wherein a respective middle pressure between the cold displacement piston and the hot displacement piston is between 20 bar and 75 bar.

14. The domestic appliance of claim 13, wherein the respective middle pressure is between 30 bar and 50 bar.

15. The domestic appliance of claim 1, wherein the cold displacement piston has a recess to least partially receive a body that is fixedly arranged in a working volume, the body immersing into the recess as a function of a stroke of the cold displacement piston.

16. The domestic appliance of claim 15, wherein the body has a cylindrical shape.

17. The domestic appliance of claim 16, wherein the body has a diameter between 25 mm and 75 mm.

18. The domestic appliance of claim 17, wherein the diameter is between 40 mm and 50 mm.

19. The domestic appliance of claim 1, wherein the cold displacement piston and the hot displacement piston run in a common cylinder.

20. The domestic appliance of claim 1, wherein the cold displacement piston and the hot displacement piston run collinearly.

21. The domestic appliance of claim 1, wherein the cold displacement piston and the hot displacement piston are arranged in a bottom group structure.

22. A method for drying a damp product by means of a process air stream conducted in a process air channel, the method comprising:
   conducting the process air stream through:
      a treatment chamber that includes the damp product,
      a cooling assembly that cools the process air stream and condenses moisture from the process air stream after the process air stream has passed through the treatment chamber, and
      a heating assembly that heats the process air stream before the process air stream flows through the treatment chamber;
   supplying heat from the process air stream to a working fluid in the cooling assembly;
   supplying heat from the working fluid to the process air stream in the heating assembly;
   conveying the working fluid in a regenerative gas cycle process which includes a Vuilleumier gas cycle process and which drives a cold displacement piston and a hot displacement piston that are mechanically coupled to each other as part of a free-piston vibrating system and at least in part define a cold working volume and hot working volume, respectively, wherein the cold displacement piston has a higher mass than the hot displacement piston; and
   reducing an amount of drying applied to the process air stream as a temperature difference between the cold working volume and the hot working volume increases.

23. The method of claim 22, wherein the cold displacement piston and the hot displacement piston are driven in a speed-controlled manner.

24. The domestic appliance of claim 1, further comprising a first regenerator and a second regenerator through which the working fluid is configured to flow when flowing between the cold working volume and the hot working volume, wherein a direction of the piston stroke, a portion of the process air stream through the cooling assembly, a portion of the process air stream through the heating assembly, a portion of flow through the first regenerator and a portion of flow through the second regenerator are all parallel and coplanar.

* * * * *